UNITED STATES PATENT OFFICE.

CARLETON ELLIS, OF MONTCLAIR, NEW JERSEY.

PROCESS OF MAKING CATALYZERS.

1,251,204.     Specification of Letters Patent.     Patented Dec. 25, 1917.

No Drawing.     Application filed May 1, 1917. Serial No. 165,764.

*To all whom it may concern:*

Be it known that I, CARLETON ELLIS, a citizen of the United States, residing at Montclair, in the county of Essex and State of New Jersey, have invented certain new and useful Improvements in Processes of Making Catalyzers, of which the following is a specification.

The present invention relates to the production of catalyzers by purely thermal decomposition of compounds of nickel or similar metals capable of acting as catalysts in the free state, without the introduction of reducing gases from the outside.

In carrying out the process of the present application I first prepare a mixture of an organic compound of nickel, and nitrate of nickel. The organic compound employed may be various salts, such as formate, acetate, propionate, lactate, tartrate, citrate or various others, preference being given to water-soluble salts. The water-soluble nickel organic salt is mixed with nickel nitrate or nickel nitrite in such proportions that when heated, the excess of carbon and hydrogen in the nickel organic compound will be sufficient to reduce the oxygen of the nitrate or nitrite, with the production of carbon dioxid, water and free nitrogen. I prefer, in view of the fact that it is not ordinarily possible to employ exactly the necessary proportion, to employ a slight excess of the organic compound, or in other words a slight deficiency of the nitrate or nitrite.

The mixture of these materials is preferably finely ground, for example in a wet condition, in which operation an extremely intimate mixture of the two materials is produced. The materials may be completely dissolved and the solutions mixed if desired, but this is ordinarily not necessary. The wet mixture from the grinding operation is then dried, for example on a hot plate, producing a dry very intimate mixture of the two materials. The mixture of organic compound and nitrate or nitrite is then placed within a body of oil in a receptacle which need not be pressure-tight, and which is preferably provided with a lid or cover, although this lid or cover does not have to be of such a nature as to fit absolutely tight. The mixture is then heated, without adding any reducing gases, to a temperature sufficient to cause the organic compound and the nitrate or nitrite to react with each other, with the production of elementary nickel, carbon dioxid, water vapor and nitrogen, possibly together with gaseous compounds. The temperature necessary will depend to a considerable extent upon the nature of the specific substances employed, a mixture of nickel acetate and nickel nitrate being reduced at a temperature approximating 300 or 320° C.

It is to be understood that while I have described nickel as being the preferred metal, I may employ similar compounds of vanadium, chromium, manganese, iron, cobalt or copper, in other words metals having an atomic weight of 51 to 63.6.

It is probable that reactions take place substantially as follows, nickel formate and nickel propionate being the substances given for the purposes of illustration.

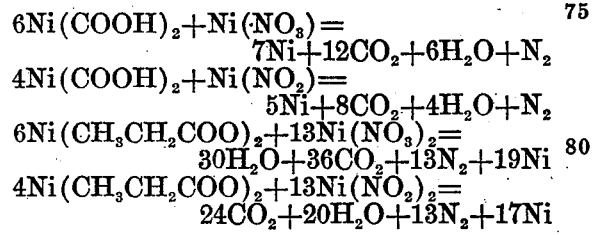

What I claim is:

1. A process which comprises subjecting to heat, while sealed from contact with air, a mixture comprising an organic compound of a non-noble metal having an atomic weight between 51 and 63.6, and a salt of such a metal which contains nitrogen and oxygen.

2. A process which comprises heating in a bath of oil, a mixture of an organic compound of nickel and an inorganic nitrogen-and-oxygen-containing nickel salt.

In testimony whereof I affix my signature.

CARLETON ELLIS.